Oct. 29, 1963

C. M. JORDAN ET AL 3,109,159

COMBINATION TAIL LAMP AND BACK-UP LAMP

Filed March 22, 1961

INVENTOR.
Charles M. Jordan &
John W. Yee
BY
P.E. McElynn Jr.
ATTORNEY

INVENTOR.
Charles M. Jordan &
John W. Yee
BY
ATTORNEY

United States Patent Office 3,109,159
Patented Oct. 29, 1963

3,109,159
COMBINATION TAIL LAMP AND
BACK-UP LAMP
Charles M. Jordan, Birmingham, and John W. Yee, Roseville, Mich., assignors to General Motors Corporation, Detroit, Mich., a corporation of Delaware
Filed Mar. 22, 1961, Ser. No. 97,637
4 Claims. (Cl. 340—67)

This invention relates to a lamp assembly adapted to provide selectively light rays of two different colors and, more particularly, to a combination rear lamp and back-up lamp assembly for automobiles which will selectively provide substantially red light and substantialy white back-up light.

As will be readily apparent to those acquainted with the art of vehicle lighting, various governmental specifications require automotive vehicle manufacturers to equip each vehicle with a rear lamp assembly which will glow with a red color when energized. As used herein except as otherwise noted, the term rear lamp or rear lamp assembly comprehends not only a source of steadily glowing tail light used at night time, but also may include selectively and intermittently energizable sources of stop and turn signal lighting to signify when the vehicle is being braked or a turn is being contemplated, or any one of these types of lighting alone or various combinations thereof.

According to modern practice, a typical rear lamp assembly provides all three types of lighting (tail, stop and turn signal) and comprises a lamp body having an inner surface which may or may not be reflectorized depending upon the circumstances, a red lens rigidly secured over the mouth of the body to form a lamp envelope and a single lamp bulb suitably mounted on the lamp body and enclosed within the lamp envelope. The lamp bulb of such a typical assembly includes two filaments; one filament is adapted to be energized at dark to provide a steadily glowing source of substantially white tail light rays which are colored red upon passing through the red lens of the lamp assembly. The second filament within the bulb is adapted to be selectively energized in response to application of the vehicle brakes or operation of the turn signal selector mechanism to provide a second source of substantially white stop or turn light rays which are colored red upon being transmitted through the lamp lens. While a conventional combination tail, stop and turn signal lamp assembly as aforedescribed is now almost universally employed on vehicles, it will be readily appreciated that the steadily glowing tail light and the intermittently energizable brake and turn signal lights could actually be incorporated in separate rear lamp assemblies.

In addition to providing tail, stop and turn signal lighting as aforedescribed, whether contained in a single lamp assembly or in separate assemblies, it has also been the practice to equip the rear of automotive vehicles with back-up lamp assemblies which, for the purpose of this disclosure, may be considered to be substantially identical to the rear lamp assembly aforedescribed except for the fact that such a back-up lamp assembly is provided with a substantially clear lens so as to emit substantially white light from a single filament in a back-up lamp bulb to light the area behind the vehicle.

Consequently, since light to be utilized for backing purposes should be substantially white to obtain optimum illumination of the area behind the vehicle and since various government specifications as aforementioned require tail, stop and turn signal lighting to be red, it has been the usual practice to equip the rear of the vehicle with at least four separate lamp assemblies and often more. In other words, each side of the vehicle at the rear thereof has been equipped with at least a combination tail, stop and turn signal lamp assembly to provide red light, and a separate back-up lamp assembly to provide white light.

This type of installation is not entirely satisfactory because it requires multiple arrangement of lamp assemblies, and because of aesthetic or styling considerations; that is, particularly in day time, the vehicle is equipped with multiple lamps having different colored appearances, the red of the lens of the rear lamp assembly and the white or clear color of the white lens of the back-up lamp assembly.

It it, therefore, a principal object and feature of this invention to provide a single lamp assembly which will selectively supply light rays having at least two different colors, thereby incorporating the functions of two different lamps in a single lamp assembly.

It is yet another object and feature of this invention to provide a combination rear and back-up lamp assembly for a vehicle comprising a single lamp body and single lamp lens operatively secured together to form a lamp envelope enclosing a source of red tail, stop and turn signaling light rays and a source of substantially white back-up light rays, all of which rays are transmitted through the common lens of the assembly to provide red tail, stop, and turn signal lighting to meet various governmental specifications and relatively white back-up lighting for optimum illumination of the area of the ground to the rear of the vehicle during backing of the latter.

It is yet another object and feature of this invention to provide a combination lamp assembly of the type aforementioned in which, for styling purposes primarily, multiple arrangements of such lamp assemblies may be installed on the rear of the vehicle and all appear to be the same color without any light source energized because each assembly has a lens of the same color.

In general, these and other objects of this invention are attained according to a preferred embodiment of the invention in a combination rear and back-up lamp assembly comprising a concave reflectorized lamp body having a focal point, a substantially clear lens operatively secured over the mouth of the body to form therewith a lamp envelope enclosing the aforementioned focal point, a partition extending between the lamp body and the lens to divide the lamp envelope into upper and lower envelope sections symmetrically disposed with respect to the focal point of the lamp body, a source of colored or red tail, stop and turn signal light rays located substantially at the aforementioned focal point so that colored or red light rays emanating therefrom pass to both envelope sections and are reflected by the reflector body in these sections through both sections and the lens of the assembly to illuminate the roadway to the rear of the vehicle. Additionally, a source of substantially or relatively white back-up light rays is provided in one of the envelope sections to provide white light rays for redirection from the reflector body through said sections for transmission though the lens of the assembly to illuminate the roadway to the rear of the vehicle during backing of the latter. The partitioning means of the lamp assembly permits the tail, stop and turn signal light source to provide a red glow of light from substantially the entire surface of the clear lens of the assembly when the back-up light source is not illuminated and bright white light from the lower half of the assembly from the back-up light source when the rear lamp source is not illuminated. Upon illumination of both sources, the partitioning means insures that strong white back-up light is available from the lower half of the assembly while the upper half thereof will glow with the red light required to meet specifications. Finally, the red source of tail, stop and turn signal light rays is located in a unique manner relative to the lamp envelope and the lens of the assembly whereby such source is obscured from view from the exterior of the assembly and the lens of the assembly retains its substantially clear or white appearance.

These and other objects, features and advantages of the invention will become more apparent hereinafter as the description of the invention proceeds, and in which reference is made to the drawings in which.

Figure 1:
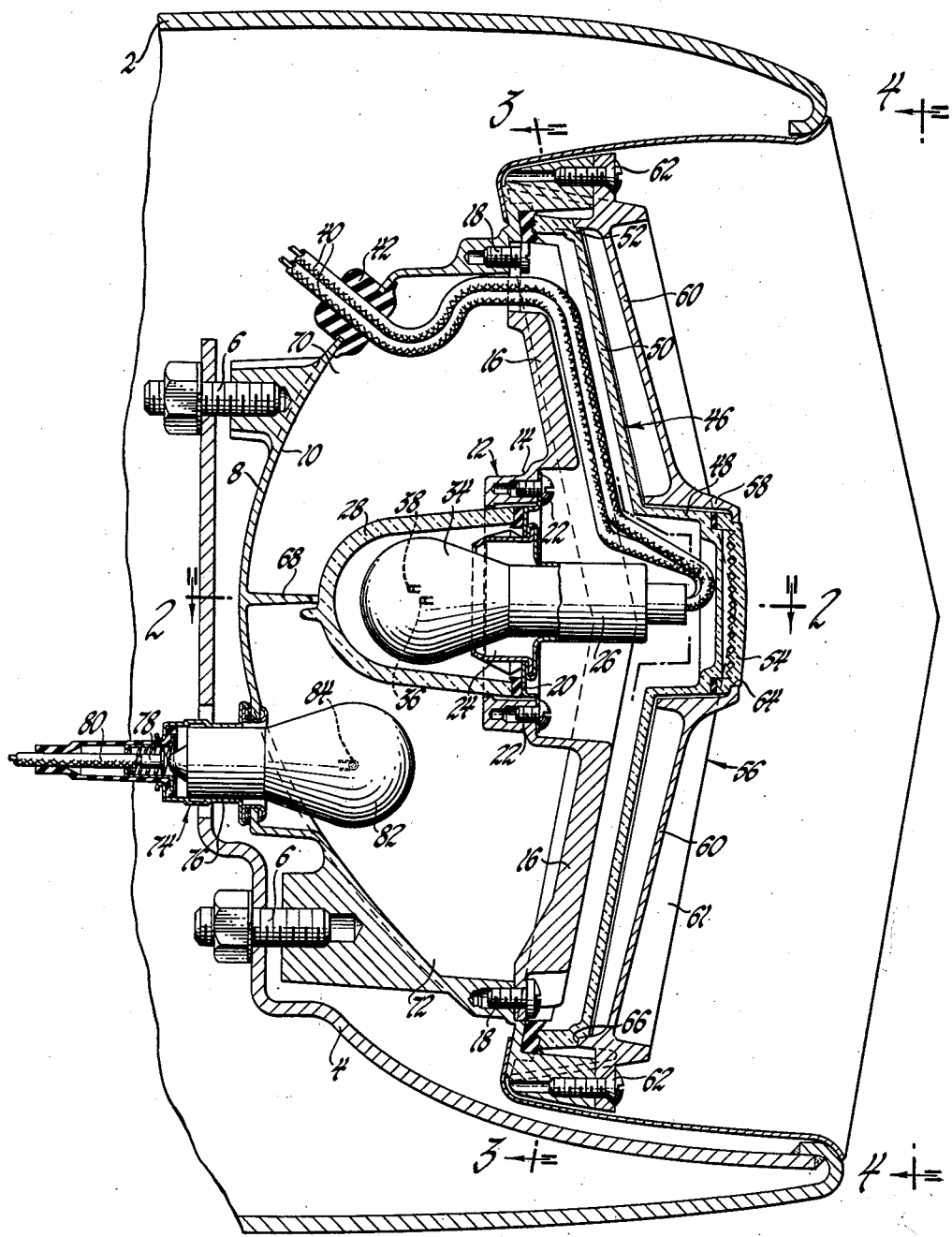
FIGURE 1 is vertical elevation in section of a combination rear and back-up lamp assembly constructed in accordance with this invention.

Referring now to the drawings, the numeral 2 indicates a housing of the type typically formed in or as part of the rear panel or fender construction of the vehicle, and which housing opens to the rear of the vehicle. A suitable lamp mount 4 is rigidly secured within the housing and, by means of a suitable number of fasteners 6, is adapted to rigidly mount thereon a lamp body 8. The lamp body 8 includes an inner concave and preferably paraboloidal surface 10 which is rendered highly reflective preferably by depositing an aluminum coating thereon or applying a bright white paint finish, or otherwise.

A rear lamp assembly is illustrated generally at 12 and comprises an annular support 14 having an opening therethrough and formed integral with vertically extending oppositely projecting relatively narrow ribs 16 having their ends suitably fastened as indicated at 18 to opposite peripheral portions of the lap body 8. A small mounting plate 20 is suitably fastened as at 22 to the support member 14, and has an opening therein to receive a snap-in collar 24 having yieldable prongs thereon which is rigidly secured to a conventional lamp socket 26. A red lens 28 includes a shouldered periphery 30 seated against a gasket carried by plate 20, and is retained in this position opposite the opening in the socket 26 by a flange 32 on the support member 14 engaging the shouldered, peripheral edge 30 of the lens. The rear lamp assembly is so positioned by the construction aforedescribed as to removably receive a conventional bulb 34 having a tail lamp filament 36 and a stop and turn signal filament 38 which, upon insertion of the bulb within the socket, will be located substantially at or adjacent to the focal point of the reflectorized surface 10 of the body 8. A pair of electrical conductors 40 extend through a suitable sealing grommet 42 in the wall of the body 8, through a suitable opening in the upper rib 16 and down the rib to the base of the socket 26 for connection to a conventional terminal construction 44 for selectively energizing the respective filaments of the bulb 34.

A substantially clear lens 46 includes a centrally located cylindrical extension 48 providing clearance for the socket 26, and a surrounding body portion 50 having a peripheral rim 52 seated against a gasket carried by the lamp body 8. A conventional cube-corner red reflex button 54 seats upon the lens extension 48, and functions in the usual manner to reflect incident light rays emanating from the rear of the vehicle. A lens mount 56 includes a cylindrical housing 58 which embraces the lens extension 48 and a pair of oppositely vertically projecting narrow ribs 60 having their terminal ends joined to a frame 61 secured to the peripheral edge of the lamp body 8 by means of the fasteners 62. As illustrated particularly in FIGURES 1 and 2, shoulder means 64 are provided on the housing 58 of the lens mount so as to retain the reflex button 54 in the position shown on the lens, while additional shoulder means 66 are provided on frame 61 to retain the periphery of lens 46 seated against a gasket on the lamp body. It will be noted that the lens 46 is retained in position covering the mouth of the lamp body 8 while the reflect button 54 is aligned with the base of the light socket 26.

Figure 2:
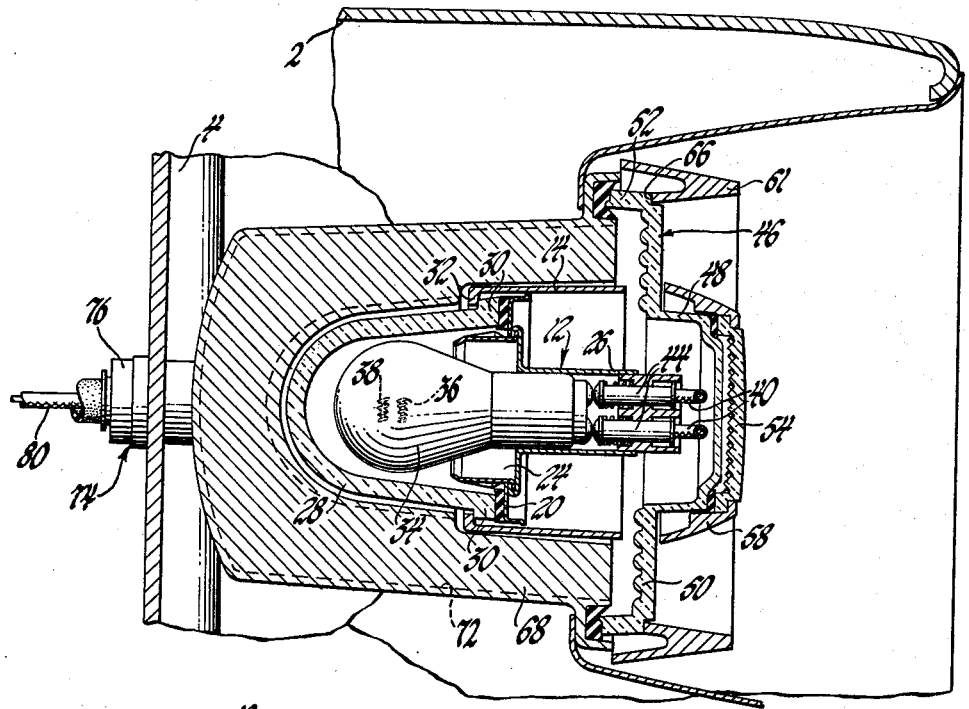
FIGURE 2 is a view taken on line 2—2 of FIGURE 1.
Figure 3:
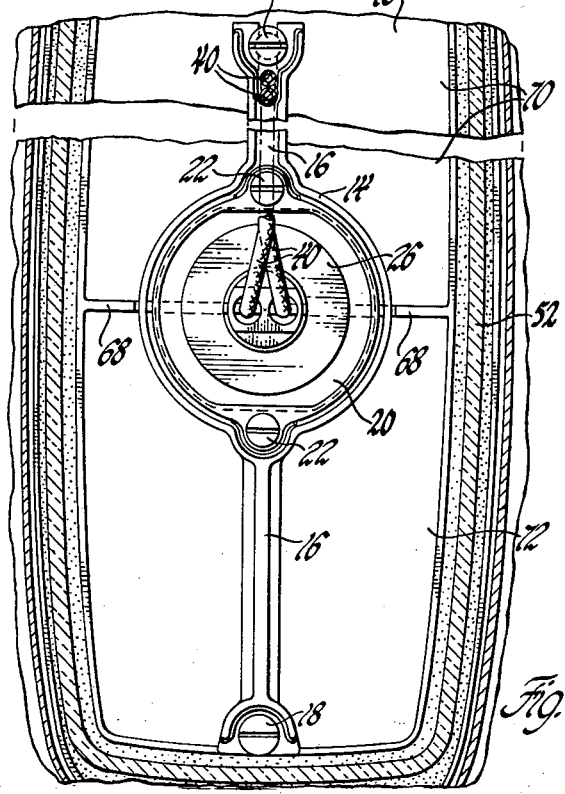
FIGURE 3 is a fragmentary view taken on line 3—3 of FIGURE 1.
Figure 4:
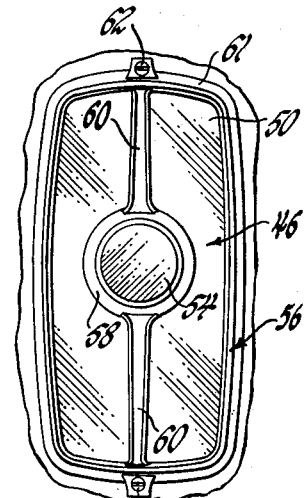
FIGURE 4 is a view taken on line 4—4 of FIGURE 1 but reduced in size.

A narrow partition 68, generally U-shaped in plan view as shown in FIGURE 2, is formed integral with the lamp body 8, and extends between the latter and a point closely adjacent to the inner face of the lens 46. As will be apparent from FIGURE 2, this partition closely surrounds the rear lamp assembly 12 and particularly lens 28 and the housing 14. Furthermore, as illustrated in FIGURE 1, this partition lies in a plane substantially containing the filaments 36 and 38 and hence the focal point of the reflector body 8, and divides the lamp envelope into an upper envelope section 70 and a lower envelope section 72.

The back-up lamp assembly 74 comprises a conventional tubular socket 76 adapted to be crimped or otherwise rigidly secured to the lamp body 8 so as to open into the lower envelope section 72. This socket includes a conventional terminal construction 78 in its base connected through a suitable conductor 80 to a source of electrical energy. This socket is adapted to removably mount a back-up light bulb 82 containing a single filament 84 which generates substantially white back-up lighting.

From the foregoing description it may be seen that the rear lamp assembly 12 is contained entirely within the lamp envelope and is generally axially aligned with the axis of the reflex button 54. Moreover, insertion of a rear lamp bulb 34 in the socket 26 results in disposition of the filaments 36 and 38 thereof substantially at the focal point of the reflecting surface 10 in the plane of the partition 68. Consequently, selective energization of either of the filaments 36 and 38 results in transmission of light rays through the rear lamp lens 28 into both the upper envelope section 70 and the lower envelope section 72. Due to the red color of the lens 28, these light rays will be red and will strike the reflecting surface 10 in both envelope sections and be redirected toward and transmitted through the clear portion 50 of the lens 46. On the other hand, energization of the back-up lamp filament 84 results in this light being substantially contained in the lower envelope section 72 for redirection from the lower section of the lamp body through the lower portion of the lens area 50 to illuminate the area to the rear of the vehicle with a white light.

In the event that one or the other filaments of the rear lamp assembly 12 and the filament of the back-up lamp assembly 74 are simultaneously energized, as while backing the vehicle at night, the combination lamp construction will provide a relatively bright white light from the lower envelope section 72 to illuminate the roadway to the rear of the vehicle while also providing a segregated area of red light from the upper envelope section 70 for rear lighting purposes. More specifically, when the back-up lamp and the rear lamp are simultaneously energized, red light rays are provided in both envelope sections from rear lamp bulb 34, while substantially all white light from back-up bulb 82 is contained within lower envelope section 72. Naturally, therefore, red light rays pass through the clear lens portion 50 forming a part of the upper envelope section 70 of the lamp. On the other hand the white and red rays in the lower envelope section 72 are mixed, and pass from the lower envelope section through the lower half of lens 46. However, the intensity of the white rays from the back-up bulb 82 is much greater than that of the red rays emitted from rear lamp lens 28 with the result that the mixed rays emerging from the lower envelope section as aforedescribed are sufficiently white to provide good illumination for backing purposes.

It should be noted in this regard that the red rear lamp lens 28 is a filter which drastically reduces the intensity of light generated by the filament 36 and 38; that is, by a factor up to approximately four. Thus, even where the candle power ratings of back-up lamp filament 84 and the stronger of rear lamp filaments 36 and 38 are equal, the red light in the lower envelope section will have approximately one-fourth the intensity of the red light therein. For example, in the lamp illustrated, the tail light filament 36 has a four candle power rating while the stop and turn filament 38 and back-up filament 84 both have a thirty-two candle power rating. The filtered light from either filament 36 or 38, therefore, is overpowered by the white light from filament 84 to provide a relatively strong white light emerging from the lower envelope section of the lamp.

It will also be noted from the foregoing description that the alignment of rear lamp assembly 12 with reflex button 54 and the disposition of the rear lamp assembly within the lamp envelope virtually conceals the rear lamp assembly from view from behind the vehicle.

It will now be seen that the combination rear and back-up lamp assembly aforedescribed will provide colored or red tail, stop and turn signal lighting under all conditions of operation to satisfy governmental specifications, while additionally selectively providing a relatively white back-up lighting. Moreover, a combination lamp of this type provides all of the lighting functions heretofore obtained by multiple groupings of lamps on the rear of a vehicle. On the other hand, a lamp assembly of this type will permit multiple groupings of lamps for aesthetic or styling purposes in which all of the lamps, or more particularly the viewable exposed lenses thereof, will have the same color.

While but one form of the invention has been shown and described, other forms will be apparent to those skilled in the art. Therefore, the embodiment shown in the drawings is merely for illustrative purposes, and is not intended to limit the scope of the invention which is defined by the claims which follow.

We claim:

1. A lamp assembly for selectively providing colored and relatively white light comprising a lamp body, a substantially clear lens secured to said body to form with the latter a lamp envelope, means extending between said body and lens to partition said envelope into two envelope sections, an opening in said partitioning means, a source of colored light disposed within said opening symmetrically of said partitioning means emitting colored light rays into both of said envelope sections for transmission through said lens, and a source of relatively white light mounted in one of said envelope sections emitting white light rays within said one envelope section for transmission through the portion of said lens associated with said one envelope section.

2. A lamp assembly for selectively providing colored and relatively white light comprising a lamp body having a focal point, a substantially clear lens secured to said body to form with the latter a lamp envelope enclosing said focal point, means extending between said body and lens in a plane centering said focal point to partition said envelope into two envelope sections, an opening in said partitioning means containing said focal point, a source of colored light disposed within said opening substantially at said focal point providing colored light rays in both of said envelope sections for redirection from said body through both of said envelope sections and said lens, and a source of relatively white light mounted in one of said envelope sections to provide relatively white light rays for redirection from said body through said one envelope section for transmission through said one envelope section and said lens.

3. A lamp assembly for selectively providing colored and relatively white light comprising a lamp body, lens means operatively secured to said body to form with the latter a lamp envelope, said lens means including a reflex element to reflect incident light rays emanating from outside said envelope and a substantially clear portion capable of transmitting light rays emanating from within said envelope, a first lamp assembly comprising a socket having a lamp removably mounted therein, a colored lens surrounding said lamp, means mounting said first lamp assembly within said envelope with said socket opposite said reflex area and said lamp presented toward said body, a partition extending between said body and said lens means and about said first lamp assembly to divide said envelope into two envelope sections whereby colored light rays emitted from said colored lens are transmitted through both of said envelope sections and the clear area of said lens means, and a second lamp assembly comprising a socket mounted on said body within one of said envelope sections having a source of relatively white light mounted therein whereby a substantial portion of the white light rays emanating from said last-named source are transmitted through said one envelope section and a portion of the clear area of said lens means.

4. A combination rear and back-up lamp assembly comprising a lamp body having a focal point, lens means operatively secured to said body to form with the latter a lamp envelope enclosing said focal point, said lens means including a colored reflex element to reflect incident light rays emanating from outside said envelope and a substantially clear area surrounding said reflex element to transmit therethrough light rays emanating from within said envelope, a rear lamp assembly comprising a socket having an open end adapted to removably receive a lamp, a colored lens surrounding said lamp and the open end of said socket and transmitting light rays emanating from said lamp mounted within said socket, means mounting said rear lamp assembly within said envelope with said socket opposite said reflex element and said lamp presented toward said body and is located substantially at said focal point, a partition extending between said body and said lens means and about said rear lamp assembly, said partition lying in a plane substantially containing said focal point and dividing said envelope into two envelope sections whereby colored light rays emitted from said colored lens are transmitted through both of said envelope sections and the clear area of said lens means, and a back-up lamp assembly comprising a socket mounted on said body within one of said envelope sections having a source of relatively white light mounted therein located remotely from said focal point within said one envelope section whereby a substantial portion of the white light rays emanating from said last-named source are transmitted through said one envelope section and a portion of the clear area of said lens means.

References Cited in the file of this patent

UNITED STATES PATENTS

| 2,005,761 | Speeg | June 25, 1935 |
| 2,005,963 | Axelberg | June 25, 1935 |